US010062035B1

(12) United States Patent
Shaked et al.

(10) Patent No.: US 10,062,035 B1
(45) Date of Patent: Aug. 28, 2018

(54) USING VARIABLE LENGTH REPRESENTATIONS FOR MACHINE LEARNING STATISTICS

(71) Applicant: Google LLC, Mountain View, CA (US)

(72) Inventors: Tal Shaked, Los Altos, CA (US); Tushar Deepak Chandra, Los Altos, CA (US); Yoram Singer, Palo Alto, CA (US); Tze Way Eugene Ie, San Francisco, CA (US); Joshua Redstone, Cambridge, MA (US)

(73) Assignee: Google LLC, Mountain View, CA (US)

( * ) Notice: Subject to any disclaimer, the term of this patent is extended or adjusted under 35 U.S.C. 154(b) by 368 days.

(21) Appl. No.: 14/104,004

(22) Filed: Dec. 12, 2013

(51) Int. Cl.
  *G06F 15/18* (2006.01)
  *G06N 99/00* (2010.01)
  *G06F 12/02* (2006.01)

(52) U.S. Cl.
  CPC ....... *G06N 99/005* (2013.01); *G06F 12/0246* (2013.01)

(58) Field of Classification Search
  CPC ...................................... G06N 99/00
  USPC .............................. 706/15, 45, 12
  See application file for complete search history.

(56) References Cited

U.S. PATENT DOCUMENTS

| | | | | |
|---|---|---|---|---|
| 6,405,251 B1 * | 6/2002 | Bullard | .................. | G06Q 30/04 709/224 |
| 7,519,797 B1 * | 4/2009 | Stiehl | .................... | G06F 9/3867 712/225 |
| 2006/0116989 A1 * | 6/2006 | Bellamkonda | .... | G06F 17/30489 |
| 2007/0260641 A1 * | 11/2007 | Bohannon | ........... | G06F 11/3447 |
| 2015/0187002 A1 * | 7/2015 | Guccione | ............... | G06Q 40/04 705/37 |

OTHER PUBLICATIONS

Wikipedia, Machine Learning page, downloaded Feb. 26, 2016.*
Wikipedia, Linear Regression pages, downloaded Feb. 26, 2016.*
Wikipedia, Hash Table page, downloaded Feb. 26, 2016.*
Modern Embedded Computing, by Barry, published 2012.*
Greenwald and Khanna, "Power-Conserving Computation of Order-Statistics over Sensor Networks," Proceedings of the twenty-third ACM SIGMOD-SIGACT-SIGART symposium on Principles of database systems, Jun. 14-16, 2004, pp. 275-285.
Wolpert, "Monte Carlo Integration in Bayesian Statistical Analysis," Contemporary Mathematics, 1991, vol. 115, pp. 101-116.

(Continued)

*Primary Examiner* — David R Vincent
(74) *Attorney, Agent, or Firm* — Fish & Richardson P.C.

(57) ABSTRACT

The present disclosure provides methods and systems for using variable length representations of machine learning statistics. A method may include storing an n-bit representation of a first statistic at a first n-bit storage cell. A first update to the first statistic may be received, and it may be determined that the first update causes a first loss of precision of the first statistic as stored in the first n-bit storage cell. Accordingly, an m-bit representation of the first statistic may be stored at a first m-bit storage cell based on the determination. The first m-bit storage cell may be associated with the first n-bit storage cell. As a result, upon receiving an instruction to use the first statistic in a calculation, a combination of the n-bit representation and the m-bit representation may be used to perform the calculation.

15 Claims, 3 Drawing Sheets

(56) References Cited

OTHER PUBLICATIONS

Nicholson and Baldwin, "Statistical Interpretation of Compound Nominalisations," Proceedings of the Australasian Language Technology Workshop 2005, Dec. 2005, pp. 152-159.
Kumar and Byrne, "Minimum Bayes—Risk Decoding for Statistical Machine Translation," Proceedings of HLT/NAACL, 2004, 8 pages.

* cited by examiner

USING VARIABLE LENGTH REPRESENTATIONS FOR MACHINE LEARNING STATISTICS

BACKGROUND

In general, large-scale data processing systems process large amounts of data from various sources and/or machines. As a specific example, large-scale machine learning systems may process large amounts of training data from data streams received by the system. A data stream may include training examples corresponding to specific instances of an event or action such as when a user selects a specific search result, or when a single video is viewed from among multiple videos presented to a user. An example may contain features (i.e., observed properties such as a user being located in the USA, a user preferring to speak English, etc.) and may also contain a label which may indicate an event or action associated with the example (e.g., a user selected a specific search result, a user did not select a specific search result, a user viewed a particular video, etc.). These training examples may be used to generate statistics for each of the features. As new examples enter the system, a statistic associated with a feature may need to be updated. However, storing and updating these statistics can require infeasible amounts of storage and can reduce the processing speed of such systems.

BRIEF SUMMARY

According to an embodiment of the disclosed subject matter a method may include storing an n-bit representation of a first statistic at a first n-bit storage cell. A first update to the first statistic may be received, and it may be determined that the first update causes a first loss of precision of the first statistic as stored in the first n-bit storage cell. Accordingly, an m-bit representation of the first statistic may be stored at a first m-bit storage cell based on the determination. The first m-bit storage cell may be associated with the first n-bit storage cell. As a result, upon receiving an instruction to use the first statistic in a calculation, a combination of the n-bit representation and the m-bit representation may be used to perform the calculation.

An implementation of the disclosed subject matter provides a system including a processor configured to store an n-bit representation of a first statistic at a first n-bit storage cell. A first update to the first statistic may be received. It may be determined that the first update causes a first loss of precision of the first statistic as stored in the first n-bit storage cell. As a result, an m-bit representation of the first statistic may be stored at a first m-bit storage cell based on the determination. The first m-bit storage cell may be associated with the first n-bit storage cell. As a result, upon receiving an instruction to use the first statistic in a calculation, a combination of the n-bit representation and the m-bit representation may be used to perform the calculation.

The present disclosure provides methods and systems for using variable length representations for representing machine learning statistics. Since these machine learning statistics often use the majority of memory needed by an overall machine learning algorithm, there may be significant advantages in allocating the appropriate precision and storage size for each statistic. Accordingly, the techniques disclosed herein for storing variable precision statistics may improve the quality of a machine learning system. Additional features, advantages, and embodiments of the disclosed subject matter may be set forth or apparent from consideration of the following detailed description, drawings, and claims. Moreover, it is to be understood that both the foregoing summary and the following detailed description are examples and are intended to provide further explanation without limiting the scope of the claims.

BRIEF DESCRIPTION OF THE DRAWINGS

The accompanying drawings, which are included to provide a further understanding of the disclosed subject matter, are incorporated in and constitute a part of this specification. The drawings also illustrate embodiments of the disclosed subject matter and together with the detailed description serve to explain the principles of embodiments of the disclosed subject matter. No attempt is made to show structural details in more detail than may be necessary for a fundamental understanding of the disclosed subject matter and various ways in which it may be practiced.

DETAILED DESCRIPTION

In general, large-scale data processing systems process large amounts of data from various sources and/or machines. As a specific example, large-scale machine learning systems may process large amounts of training data from data streams received by the system. A data stream may include training data examples corresponding to specific instances of an event or action such as when a user selects a specific search result, or when a single video is viewed from among multiple videos presented to a user. An example may contain features (i.e., observed properties such as a user being located in the USA, a user preferring to speak English, etc.) and may also contain a label which may indicate the occurrence (e.g., positive or negative) of an event or action associated with the example (e.g., a user selected a specific search result, a user did not select a specific search result, a user viewed a particular video, etc.).

A machine learning system may contain one or more learners. A learner may include numerous workers such as a mapper or a reducer. A single mapper may receive examples from multiple shards. As an example, a first mapper may receive example A and example B from a data stream. Both examples may contain features F1, F2, and F3. The mapper may generate a first statistic (e.g., based on a label indicating that a user selected a search result) for F1 based on example A and a second statistic (e.g., based on a label indicating that a user selected a search result) for F1 based on example B. More specifically, the mapper may indicate a +1 for F1 based on example A and a +1 for F1 based on example B. The two statistics for F1 (i.e., +1 and +1) may be combined at the mapper, resulting in an overall mapper statistic 'MS1' for F1 of +2. Similarly, a different mapper may also receive examples from other data streams, and generate an overall mapper statistic 'MS2' for F1 of +4 based on the respective examples in those data streams.

The overall mapper statistics (e.g., MS1 and MS2) for F1 may be provided to a reducer R1. The reducer R1 may be configured to collect overall mapper statistics from two or more mappers within the learner and generate a weight based on the collected mapper statistics. The reducer R1 may collect MS1 (i.e., +2) and may also collect MS2 (i.e., +4) and generate the weight +6. Similarly, a second reducer R2 may receive overall mapper statistics for feature F2 and generate a weight of −3. The reducers may provide the weights to a model such that the model contains at least the following:

Model: +6(F1)−3(F2) . . .

As described above, a machine learning system may process 100s of billions of features across 100s of billions of examples and may store a few statistics per feature during learning. A statistics may represent user behavior, and more specifically, a statistic may represent user action when interacting with a web-based application. These statistics associated with these features are typically represented as floating point numbers in memory. The amount of precision needed for these statistics may depend on the specific feature and typically its frequency of occurrence in the examples received by the system. Since these statistics often use the majority of memory needed by the overall learning algorithm, there may be significant value in allocating the appropriate precision for each statistic. For example, if a 64-bit float was used for every feature when a 32-bit float would be sufficient, the memory usage would be doubled, or equivalently, half the number of features would be available for a machine learning algorithm to process, which can affect the quality of the learning system. Additionally, if a 32-bit float was used for representing every statistic associated with a feature, there may be a loss of precision and can lead to inaccurate predictions made by the system.

The present disclosure provides methods and systems for using variable length representations for representing machine learning statistics. In general, floating point describes a method of representing an approximation of a real number in a way that can support a wide range of values. The numbers are, in general, represented approximately to a fixed number of significant digits and scaled using an exponent. Thus, a "floating point representation," or "representation" of a real number typically includes a fixed or maximum number of significant digits and an exponent, and may include a digit or other identifier to indicate the sign of the real number. Because floating point is an approximation of a real number and is limited by a fixed number of digits, there can be a loss of precision when using a floating point number to represent a number, such as when performing calculations using the representation.

Floating point numbers may be used for storing a machine learning statistic associated with a feature. A loss of precision in a floating point representing a statistic may be very small but when this floating point number is used in processing billions of examples, the loss of precision in a statistic can greatly affect the quality of predictions made by the system. In a typical machine learning system, only a small fraction of features may need to be represented with high precision statistics. According to the present disclosure, a technique that may be applied to machine learning includes using a small precision float, such as a single-precision floating-point format (a single), for storing a statistic associated with a feature in a low bit storage cell, e.g., 4 bytes (32 bits). When there is an update to the statistic, a loss in precision in representing the updated statistic as a single may be estimated. When the estimated loss in precision exceeds a certain threshold precision, the statistic may be promoted to a higher bit storage cell (e.g., 8 bytes (64 bits)) where it may be stored using a higher precision representation, such as a double-precision floating-point format (a double). In this case, the true value of the statistic associated with the feature may be the sum of the single and the double. To correlate the single and the double representations of a statistic, a hash table may be used to store the statistic that has been promoted to a higher precision representation. A hash table is a data structure used to implement an associative array, a structure that can map keys to values. In this case, a higher precision representation of a statistic may be stored in a high bit storage cell and a hash table may include an identification associating the high precision representation of the statistic with the low precision representation of the statistic.

Implementations disclosed herein provide methods and systems for using variable length representations for representing statistics in a machine learning system. A system may include a processor configured to store an n-bit representation of a first statistic at a first n-bit storage cell. A first update to the first statistic may be received. It may be determined that the first update causes a first loss of precision of the first statistic as stored in the first n-bit storage cell. As a result, an m-bit representation of the first statistic may be stored at a first m-bit storage cell based on the determination. The first m-bit storage cell may be associated with the first n-bit storage cell. As a result, upon receiving an instruction to use the first statistic in a calculation, a combination of the n-bit representation and the m-bit representation may be used to perform the calculation.

Figure 1:
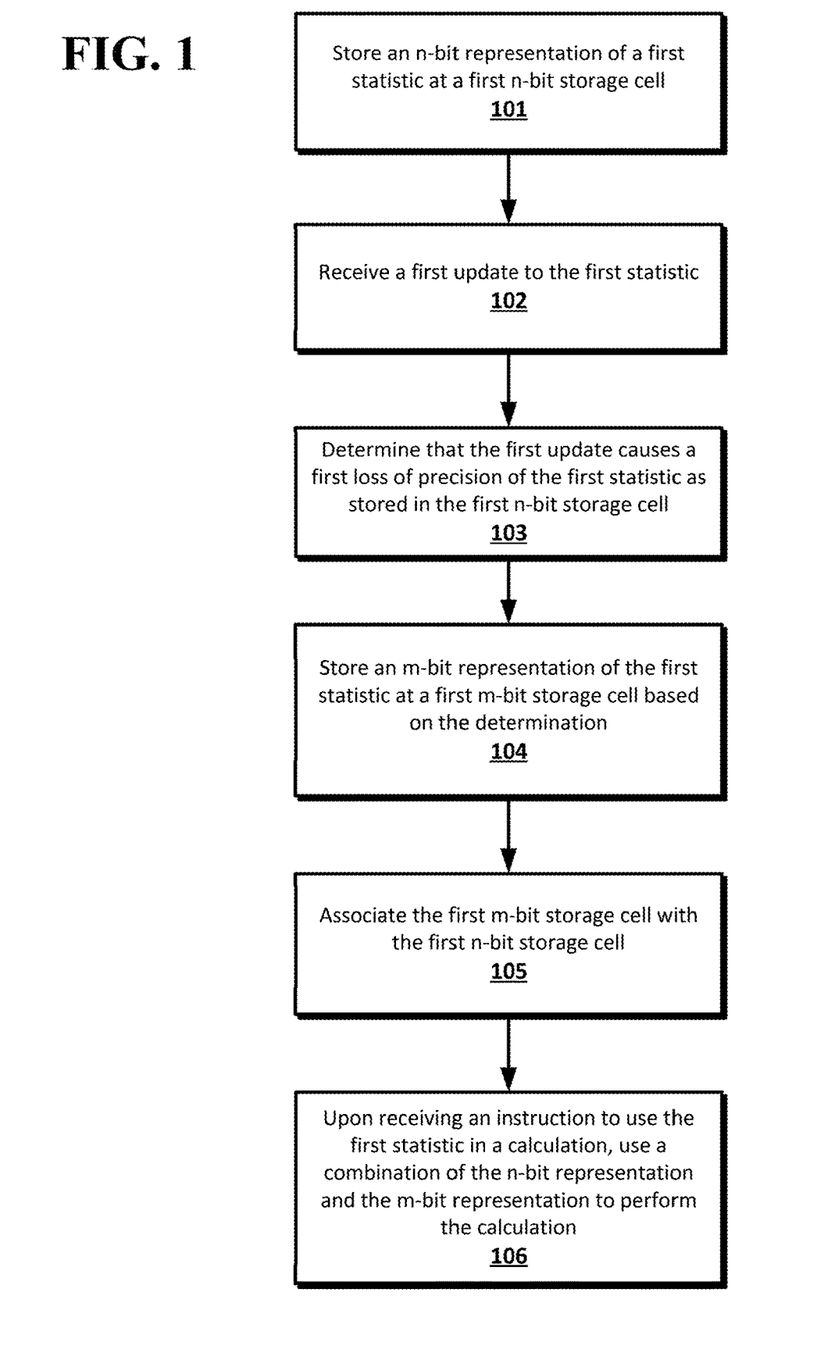
FIG. 1 shows an example process according to an implementation of the disclosed subject matter.

FIG. 1 shows an example process according to an implementation of the disclosed subject matter. A method may include storing an n-bit representation of a first statistic at a first n-bit storage cell, at 101. A statistic may be stored in an n-bit storage cell as a single-precision floating-point format (a single). Examples of a single-precision floating-point format (a single) may be a 32-bit number representation format including 1 bit for a sign (e.g., +/−), 8 bits for the width of an exponent, and 23 bits for significand precision. An example of a maximum single float representation may be $2.8457201 \times 10^{38}$. In this example, 1 bit may correspond to a + sign, 23 bits for the significand of 2.8457201, and 8 bits for the width of the exponent $10^{38}$. A first n-bit storage cell may be any bit-size storage cell for storing a low precision representation of a value. Examples of an n-bit storage cell for storing a single-precision floating-point format may be 4 bytes (32 bits), 2 bytes (16 bits), 1 byte (8 bits), and the like.

As new examples, including one or more features, are received by a machine learning system, one or more statistics associated with a feature may be updated based on new examples that include the specific feature. Accordingly, a first update to the first statistic may be received, at 102. Because the precision of a statistic associated with a feature may drastically affect the predictions made by a machine learning system, updating the statistic and storing the updated statistic as a low precision single may be detrimental to the quality of the system. As such, a determination may be made as to whether the first update causes a first loss of precision of the first statistic as stored in the first n-bit storage cell, at 103, and/or whether any such loss of precision is above a threshold. A loss of precision threshold may be based on the storage capacity of the n-bit storage cell, a user setting, a system setting, a default setting, and the like. A loss of precision may be determined by comparing a first statistic and an update to the first statistic. For example, a loss of precision may be a measurable difference between the first statistic and the update. Examples of a loss of precision may be a value, a percentage, a ratio, and any other measure of the difference between two values. As a specific example, a first statistic may be the value 2,564,102,365 associated with the feature "United States" which may be stored in a low precision storage cell as $2,564,102 \times 10^3$. An update to the statistic may be received; the update may be the value 1,000,221,001. By comparing the first statistic of 2,564,102,365 with the update of 1,000,221,001, it may be determined that a loss of precision is not caused by the update. In particular, the true value of the statistic 3,564,323,366 (the sum of the first statistic 2,564,102,365 and the update 1,000,221,001) may be stored using a low precision representation of $3,564,323 \times 10^3$. In some cases, it may be that a loss of precision resulting from storing a low precision representation of an updated statistic is too small relative to the prior value of the statistic and/or the update to be considered a loss of precision as used herein. For example, using the same example values, the updated statistic would be represented as 3,564,323,366 in a high precision representation, as opposed to the low precision representation of $3,564,323 \times 10^3$. The absolute loss of precision resulting from storing the updated statistic in a low precision representation thus may be determined as 366. However, because this is relatively small compared to the original statistic and to the update, it may fall below a precision loss threshold used in the system, or may otherwise be determined to be small enough that it is not considered a loss of precision. More generally, as described herein, an update may be considered to cause a loss of precision to a statistic if the low precision representation of the statistic before and after the update is the same, or differs by an amount less than a threshold. As another example, an update to the statistic may be received; the update may be the value 264. In this example, a loss of precision may be defined as a value over 250. Thus, it may be determined that the update of 264 causes a loss of precision of the statistic 2,564,102,365 as stored in the low precision storage cell because the addition of 264 cannot be represented in the low precision cell, i.e., the low precision representation of 2,564,102,629 (i.e., the updated statistic) is the same as the low precision representation of 2,564,102,365, namely $2,564,102 \times 10^3$.

In some cases, a loss of precision threshold for a particular statistic may depend on the feature associated with the statistic. For example, a feature that occurs frequently in the examples received by the machine learning system may be processed by the system more often than infrequently occurring features. As a result, the value of a statistic associated with a frequently occurring feature may greatly affect the accuracy of a model generated by a machine learning system, which is used to make predictions based on the statistic for the feature. Accordingly, the loss of precision allowed for a frequently occurring statistic may be set lower than the loss of precision allowed for an infrequently occurring statistic. In connection with the example above, a feature "France" may be associated with a statistic of the value $2,564,102 \times 10^3$ which may be stored in a low precision storage cell as $2,564,102 \times 10^3$. In this case, a loss of precision for the feature "France" may be defined as a difference in value between a statistic and an update to the statistic that is greater than 300. An update of the value 264 may be received. It may be determined that the update value 264 does not cause a loss of precision because it does not exceed the loss of precision value of 300 for the feature "France." As a result, because the update to the statistic associated with the feature "France" does not cause a loss of precision, the statistic may remain stored in the low precision storage cell as $2,564,102 \times 10^3$. Thus, although an update value of 264 was determined to cause a loss of precision to the statistic for the feature "United States," it may be determined that the update value of 264 does not cause a loss of precision of the statistic for the feature "France." In some configurations, the specific threshold allowed for a particular feature may be determined automatically based on, for example, an observed or determined rate at which a statistic associated with feature is updated, the relative number of updates received for that feature statistic relative to others in a model, a desired maximum time between updates of statistics, or the like.

Referring again to FIG. 1, once it has been determined that an update causes a loss of precision of a statistic stored in an n-bit storage cell, an m-bit representation of the statistic may be stored in an m-bit storage cell based on the determination, at 104, for integers m and n. For example, for a feature that occurs frequently in examples received by the machine learning system, the statistic associated with this feature may be updated frequently and/or the update values may be large. Because the accuracy of predictions made by a machine learning system are based on a model generated using statistics associated with features, it may be very important to store a high precision statistic for a frequently occurring feature. In general, the number of features that may require storage of a high precision statistic is a fraction of the total number of features received by a machine learning system.

According to an implementation, m>n such that the storage size of an m-bit storage cell is greater than the storage size of an n-bit storage cell. An n-bit storage cell may be a low bit storage cell, e.g., 4 bytes (32 bits), and it may store a low precision representation, such as a single-precision floating-point format (a single). An m-bit storage cell may be a high bit storage cell (e.g., 8 bytes (64 bits)) and it may store a high precision representation, such as a double-precision floating-point format (a double). As in the example above regarding the feature "United States," it may be determined that the update value of 264 causes a loss of precision to the statistic 2,564,102,365 when stored in an n-bit storage cell as a low precision representation of $2,564,102 \times 10^3$ (whereas the true value of the statistic including the update is 2,564,102,629). As a result, the statistic may be stored in an m-bit storage cell as using a high precision representation 2,564,102,629. In an implementation, storing the first statistic at the first m-bit storage cell may include clearing the first n-bit storage cell. Following the step of storing the high precision representation of the statistic 2,564,102,629 in the m-bit storage cell, the low precision representation $2,564,102 \times 10^3$ stored in the n-bit storage cell may be cleared and replaced with a 0.

As new updates to the statistic are received, the technique described above may be repeated. In situations in which an update does not cause a loss of precision of the statistic stored in the n-bit storage cell, the statistic may be updated and remain stored in the n-bit storage cell. Referring to the example above, a second update value of 1 to the statistic associated with the feature "United States" may be received. Because the statistic stored in the n-bit storage was cleared and replaced with 0, it may be determined that the update value of 1 does not cause a loss of precision to the statistic 0. Accordingly, the n-bit storage cell may be updated, without updating the m-bit storage cell, based on a new update received by the system. As such, the statistic 0 may be updated based on the update value 1, and the updated statistic 1 associated with the feature "United States" may be stored in the n-bit storage cell. In an implementation, new updates to the statistic may be received and stored in the n-bit storage cell until the total value of the updates cause a loss of precision to the statistic stored in the n-bit storage cell.

According to an implementation, a statistic may be used in calculations by using a combination of the data stored in an m-bit storage cell and in the corresponding n-bit storage cell. As such, the true value of a statistic associated with a feature may be the sum of the statistic stored in the m-bit storage cell and the statistic stored in the n-bit storage cell. In this case, the m-bit storage cell may be associated with the n-bit storage cell, at 105. Thus, more generally, a complete representation of a statistic may include an m-bit representation and an associated n-bit representation of portions of the statistic. For example, upon receiving an instruction to use the first statistic in a calculation, a combination of the n-bit representation and the m-bit representation may be used to perform the calculation, at 106. The association of an m-bit storage cell with an n-bit storage cell may be based on any association technique such as a lookup table, a hash lookup table, a pointer, and the like.

According to an implementation, the high precision representation of a statistic stored in an m-bit storage cell may be updated as it is determined that an update causes of loss of precision to the low precision representation of the statistic stored in an n-bit storage cell. For example, an update to a statistic may be received and it may be determined that the update causes a loss of precision of the statistic as stored in the first n-bit storage cell. As such, the m-bit storage cell may be updated; for example, a previously stored high precision statistic may be updated. In some cases, the loss of precision may or may not be the same as a previous loss of precision.

As mentioned above, a loss of precision of a statistic may depend on the feature associated with the statistic. In some cases, a loss of precision for feature may be different from a previous loss of precision associated with the same feature. As such, a loss of precision setting associated with a specific feature may be adjusted over time. For example, a new example may be received by a machine learning system and the new example may include a new feature that has never previously occurred in training data. A statistic may be generated for this new feature and this statistic may be stored using a low precision representation value in an n-bit storage cell. Because the new feature has not occurred many times in training examples received by the system, a first loss of precision may be set at an initial value. As more training examples including the feature are received by the system, updates to the statistic may be received. It may be determined that one or more update values causes a loss of precision of the statistic as stored in the n-bit storage cell, as previously described. As a result, a high precision representation of the statistic may be stored in a higher precision m-bit storage cell. As new training examples including the new feature are received by the system, it may be determined that the rate of occurrence of the new feature in the examples is increasing. A rate of occurrence may be generated for a feature based on the number of occurrences out of a set number of training examples (e.g., over a set time period, over all time, etc.) received by the system. As a result, based on the increasing frequency of the new feature, the loss of precision threshold may be lowered to increase the likelihood that the stored statistic associated with the feature is accurate.

Figure 2:
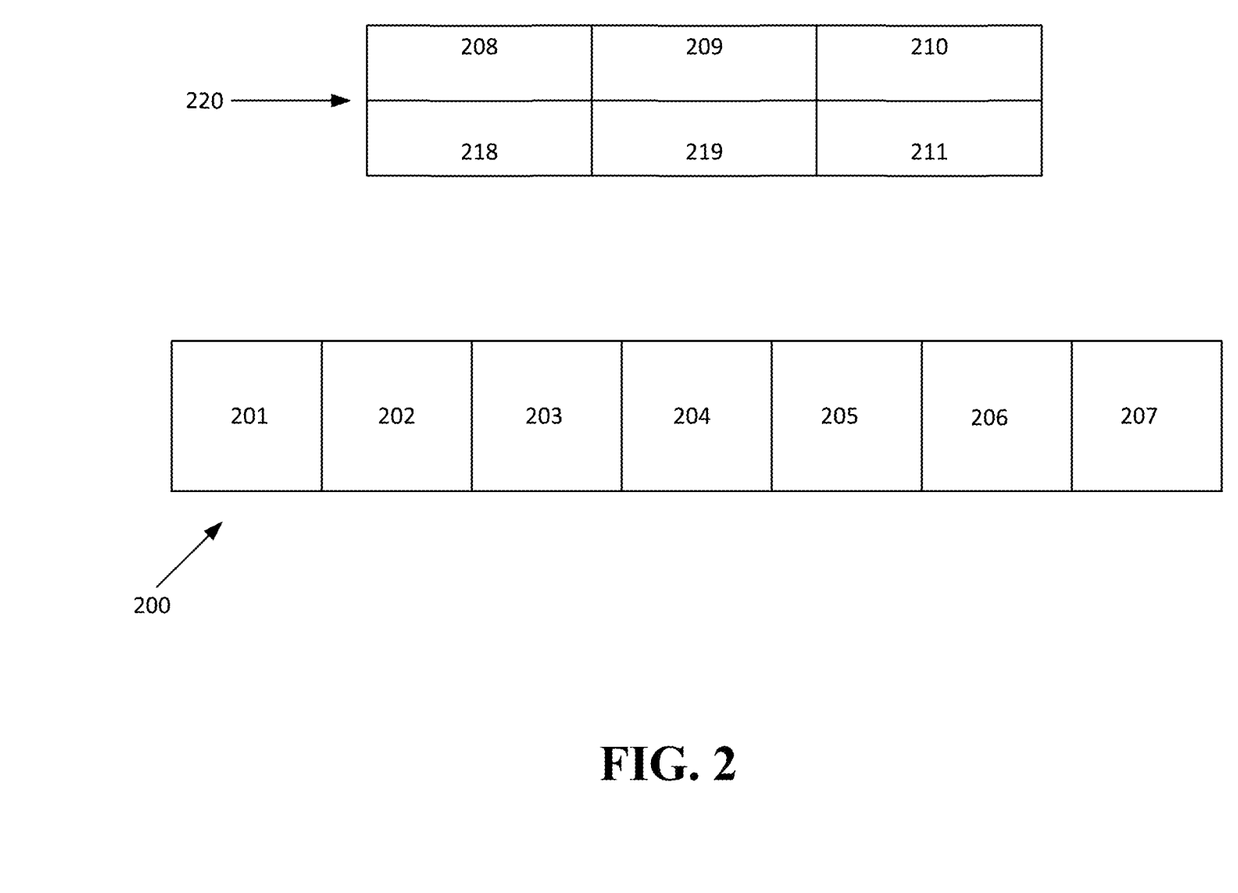
FIG. 2 shows an example storage arrangement according to an implementation of the disclosed subject matter.

According to an implementation, an n-bit storage cell may be contained within a storage medium that may or may not be the same storage medium within which an m-bit storage cell may be contained. FIG. 2 shows an example storage arrangement according to an implementation of the disclosed subject matter. As shown, storage medium 200 may include n-bit storage cells 201, 202, 203, 204, 205, 206, and 207. A storage medium 220 may include m-bit storage cells 208, 209, and 210. Each of the n-bit storage cells 201, 202, 203, 204, 205, 206, and 207 may be a low bit storage cell, e.g., 4 bytes (32 bits). Each of the n-bit storage cells 201, 202, 203, 204, 205, 206, 207 may store a low precision representation of a statistic associated with a feature. Each of the m-bit storage cells 208, 209, 210 may be a high bit storage cell (e.g., 8 bytes (64 bits)) and may store a high precision representation of a statistic associated with a feature. The table below shows the n-bit storage cells 201, 202, 203, 204, 205, 206, and 207 and the associated feature, statistic, low precision representation, and high precision representation (where applicable) for each.

TABLE 1

| n-bit storage cell | Feature | Low precision representation | High precision representation | Statistic |
| --- | --- | --- | --- | --- |
| 201 | "United States" | $20 \times 10^6$ | 2,544,102,365 | 2,564,102,365 |
| 202 | "Canada" | $983 \times 10^6$ | none | 983,278,124 |
| 203 | "United Kingdom" | $4 \times 10^6$ | 2,230,938,230 | 2,234,938,230 |
| 204 | "Italy" | $834 \times 10^6$ | none | 834,874,230 |
| 205 | "France" | $798 \times 10^6$ | none | 798,387,309 |
| 206 | "Turkey" | $562 \times 10^6$ | none | 562,398,980 |
| 207 | "India" | $8 \times 10^6$ | 1,900,298,489 | 1,908,298,489 |

As shown in Table 1 above, the statistics associated with features "United States", "United Kingdom" and "India" are stored as high precision representations. For example, the features "Canada", "Italy", "France", and "Turkey" may occur less frequently than the features "United States", "United Kingdom" and "India". Accordingly, statistics associated with the infrequently occurring features "Canada", "Italy", "France", and "Turkey" may only be stored as low precision representations.

For the feature "United States" the high precision representation 2,544,102,365 may be stored in m-bit storage cell 208 and hash lookup 218 may associate the m-bit storage cell 208 with the n-bit storage cell 201. As such, the statistic 2,564,102,365 associated with the feature "United States" may be the sum of high precision representation 2,544,102,365 with the low precision representation $20 \times 10^6$. Similarly, for the feature "United Kingdom" m-bit storage cell 209 may store the high precision representation 2,230,938,230 and n-bit storage cell 203 may store the low precision representation $4 \times 10^6$. The m-bit storage cell 209 may include hash lookup 219 which may associate the m-bit storage cell 209 with the n-bit storage cell 203 for generating the statistic 2,234,938,230. Likewise, n-bit storage cell 207 may store the low precision representation $8 \times 10^6$ associated with the feature "India" and the m-bit storage cell 210 may store the high precision representation 1,900,298,489. Again, m-bit storage cell 210 may be associated with n-bit storage cell 207 based on the hash lookup 211 which may be used for computing the statistic. For example, upon receiving an instruction to use the statistic associated with "India" in a calculation, a combination of the n-bit representation $8 \times 10^6$ and the m-bit representation, e.g., the sum of the n-bit representation and the m-bit representation, 1,900,298,489, may be used to perform the calculation.

The system may continuously receive updates to each of the statistics stored in the n-bit storage cells 201, 202, 203, 204, 205, 206, and 207. For each update, if it is determined that an update causes a loss of precision of a statistic stored in a n-bit storage cell, the statistic may be updated and stored in an m-bit storage cell. Each time it is determined that a statistic is updated and stored in an m-bit storage cell, the low precision representation stored in an n-bit storage cell 201, 202, 203, 204, 205, 206, 207 may be cleared thereby reducing the overall amount of storage required by a system. Since the statistics associated with a feature often use the majority of memory needed by the overall learning algorithm, there is significant value in allocating the appropriate precision for each statistic. Accordingly, the techniques disclosed herein allow for the use of variable length representations of machine learning statistics which may result in improved quality of a machine learning system and more accurate prediction models.

The examples described herein are provided for illustration only. For ease of illustration and explanation, relatively small values are used for specific examples of low- and high-bit representations, and representations are shown in base 10 format. However, as will be readily understood by one of skill in the art, the same techniques and principles disclosed herein may be applied to any format, encoding, and/or representation of values without departing from the scope of the present disclosure. For example, binary representations such as those defined in the IEEE Standard for Floating-Point Arithmetic (IEEE 754) may be used, such as by storing and/or processing a low-bit representation in binary 32 (single precision), binary 64 (double precision), decimal 32, or decimal 64 format, and a high-bit representation in binary 64, binary 128, decimal 64, or decimal 128 format.

Figure 3:
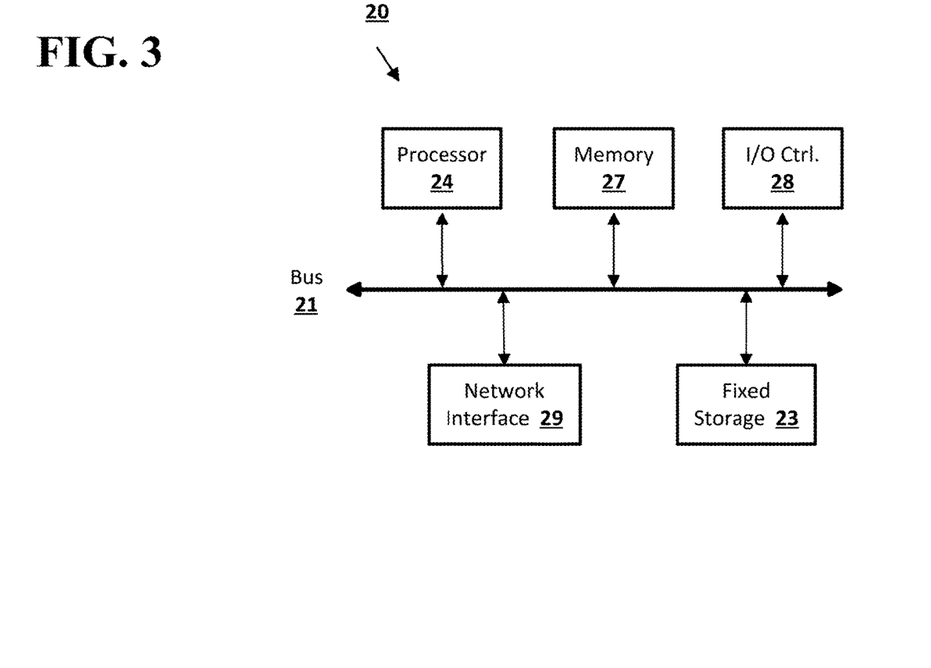
FIG. 3 shows a computer according to an embodiment of the disclosed subject matter.

Embodiments of the presently disclosed subject matter may be implemented in and used with a variety of component and network architectures. FIG. 3 is an example computer system 20 suitable for implementing embodiments of the presently disclosed subject matter. The computer 20 includes a bus 21 which interconnects major components of the computer 20, such as one or more processors 24, memory 27 such as RAM, ROM, flash RAM, or the like, an input/output controller 28, and fixed storage 23 such as a hard drive, flash storage, SAN device, or the like. It will be understood that other components may or may not be included, such as a user display such as a display screen via a display adapter, user input interfaces such as controllers and associated user input devices such as a keyboard, mouse, touchscreen, or the like, and other components known in the art to use in or in conjunction with general-purpose computing systems.

The bus 21 allows data communication between the central processor 24 and the memory 27. The RAM is generally the main memory into which the operating system and application programs are loaded. The ROM or flash memory can contain, among other code, the Basic Input-Output system (BIOS) which controls basic hardware operation such as the interaction with peripheral components. Applications resident with the computer 20 are generally stored on and accessed via a computer readable medium, such as the fixed storage 23 and/or the memory 27, an optical drive, external storage mechanism, or the like.

Each component shown may be integral with the computer 20 or may be separate and accessed through other interfaces. Other interfaces, such as a network interface 29, may provide a connection to remote systems and devices via a telephone link, wired or wireless local- or wide-area network connection, proprietary network connections, or the like. For example, the network interface 29 may allow the computer to communicate with other computers via one or more local, wide-area, or other networks, as shown in FIG. 4.

Many other devices or components (not shown) may be connected in a similar manner, such as document scanners, digital cameras, auxiliary, supplemental, or backup systems, or the like. Conversely, all of the components shown in FIG. 3 need not be present to practice the present disclosure. The components can be interconnected in different ways from that shown. The operation of a computer such as that shown in FIG. 3 is readily known in the art and is not discussed in detail in this application. Code to implement the present disclosure can be stored in computer-readable storage media such as one or more of the memory 27, fixed storage 23, remote storage locations, or any other storage mechanism known in the art.

Figure 4:
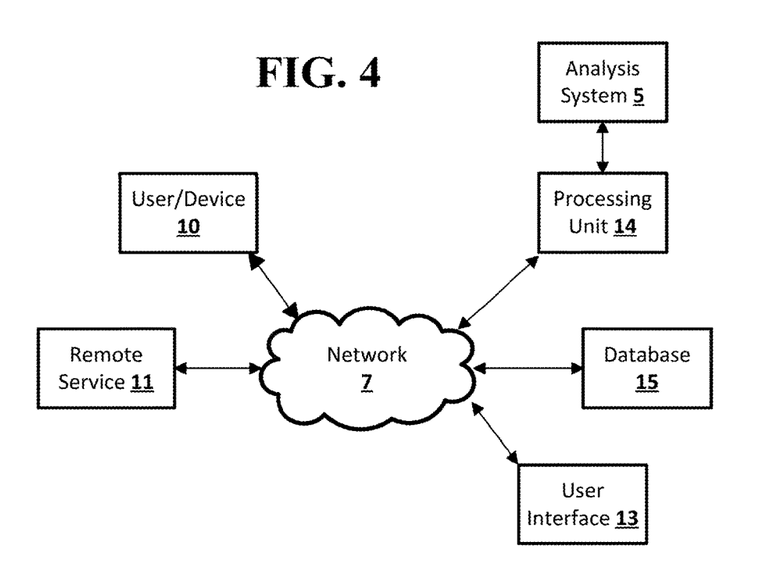
FIG. 4 shows a network configuration according to an embodiment of the disclosed subject matter.

FIG. 4 shows an example arrangement according to an embodiment of the disclosed subject matter. One or more clients 10, 11, such as local computers, smart phones, tablet computing devices, remote services, and the like may connect to other devices via one or more networks 7. The network may be a local network, wide-area network, the Internet, or any other suitable communication network or networks, and may be implemented on any suitable platform including wired and/or wireless networks. The clients 10, 11 may communicate with one or more computer systems, such as processing units 14, databases 15, and user interface systems 13. In some cases, clients 10, 11 may communicate with a user interface system 13, which may provide access to one or more other systems such as a database 15, a processing unit 14, or the like. For example, the user interface 13 may be a user-accessible web page that provides data from one or more other computer systems. The user interface 13 may provide different interfaces to different clients, such as where a human-readable web page is provided to web browser clients 10, and a computer-readable API or other interface is provided to remote service clients 11. The user interface 13, database 15, and processing units 14 may be part of an integral system, or may include multiple computer systems communicating via a private network, the Internet, or any other suitable network. Processing units 14 may be, for example, part of a distributed system such as a cloud-based computing system, search engine, content delivery system, or the like, which may also include or communicate with a database 15 and/or user interface 13. In some arrangements, an analysis system 5 may provide back-end processing, such as where stored or acquired data is pre-processed by the analysis system 5 before delivery to the processing unit 14, database 15, and/or user interface 13. For example, a machine learning system 5 may provide various prediction models, data analysis, or the like to one or more other systems 13, 14, 15.

More generally, various embodiments of the presently disclosed subject matter may include or be embodied in the form of computer-implemented processes and apparatuses for practicing those processes. Embodiments also may be embodied in the form of a computer program product having computer program code containing instructions embodied in non-transitory and/or tangible media, such as CD-ROMs, DVDs, hard drives, USB (universal serial bus) drives, flash drives, or any other non-transitory machine readable storage medium, such that when the computer program code is loaded into and executed by a computer, the computer becomes an apparatus for practicing embodiments of the disclosed subject matter. Embodiments also may be embodied in the form of computer program code, for example, whether stored in a non-transitory storage medium, loaded into and/or executed by a computer. When the computer program code is loaded into and executed by a computer, the computer becomes an apparatus for practicing embodiments of the disclosed subject matter. When implemented on a general-purpose microprocessor, the computer program code segments configure the microprocessor to create specific logic circuits. In some configurations, a set of computer-readable instructions stored on a computer-readable storage medium may be implemented by a general-purpose processor, which may transform the general-purpose processor or a device containing the general-purpose processor into a special-purpose device configured to implement or carry out the instructions. Embodiments may be implemented using hardware that may include a processor, such as a general purpose microprocessor and/or an Application Specific Integrated Circuit (ASIC) that embodies all or part of the techniques according to embodiments of the disclosed subject matter in hardware and/or firmware. The processor may be coupled to memory, such as RAM, ROM, flash memory, a hard disk or any other device capable of storing electronic information, as previously described. The memory or other storage medium may store instructions adapted to be executed by the processor to perform the techniques according to embodiments of the disclosed subject matter.

The foregoing description, for purpose of explanation, has been described with reference to specific embodiments. However, the illustrative discussions above are not intended to be exhaustive or to limit embodiments of the disclosed subject matter to the precise forms disclosed. Many modifications and variations are possible in view of the above teachings. The embodiments were chosen and described in order to explain the principles of embodiments of the disclosed subject matter and their practical applications, to thereby enable others skilled in the art to utilize those embodiments as well as various embodiments with various modifications as may be suited to the particular use contemplated.

The invention claimed is:

1. A method of training and providing a machine learning model, the method comprising:
    obtaining, by one or more computers and as input, training data, the training data comprising:
        a plurality of training examples and, for each of the training examples, a respective label, wherein each of the training examples includes a plurality of machine learning features;
    training, by the one or more computers, the machine learning model on the training data, training the machine learning model comprising:
        storing a value of a first statistic associated with a first machine learning feature of the plurality of machine learning features as a low precision representation in a first memory location,
        obtaining, based on a first training example of the training examples, a first updated value for the first statistic during the training of the machine learning model,
        determining a loss of precision from an absolute loss that would result from storing the first updated value by updating the low precision representation in the first memory location,
        determining that the loss of precision exceeds a threshold value,
        in response, storing the first updated value for the first statistic by storing a high precision representation in a second memory location that has a higher storage capacity than the first memory location,
        generating an association between the first memory location and the second memory location,
        receiving a request for the value of the first statistic for use by the machine learning model,
        determining that the low precision representation in the first memory location is associated with the high precision representation in the second memory location, and
        providing, in response to the request, a combination of the low precision representation in the first memory location and the high precision representation in the second memory location as the value of the first statistic; and
    providing, by the one or more computers and as output, the trained machine learning model.

2. The method of claim 1, wherein storing a value of a first statistic associated with a first machine learning feature in a first memory location comprises:
    storing the value of the first statistic in the first memory location in response to determining that storing the value of the first statistic in the first memory location would not result in a loss of precision that exceeds the threshold value.

3. The method of claim 1, further comprising:
    storing the association of the first memory location with the second memory location in a hash table.

4. The method of claim 1, wherein the threshold value is set based on a frequency of a statistic.

5. A system comprising:
    one or more computers and one or more storage devices storing instructions that, when executed by the one or more computers, cause the one or more computers to perform operations for training and providing a machine learning model, the operations comprising:
    obtaining, as input, training data, the training data comprising:
        training examples and, for each of the training examples, a respective label, wherein each of the training examples includes a plurality of machine learning features;
    training the machine learning model on the training data, training the machine learning model comprising:
        storing a value of a first statistic associated with a first machine leaning feature of the plurality of machine learning features as a low precision representation in a first memory location,
        obtaining, based on a first training example of the training examples, a first updated value for the first statistic during the training of the machine learning model,
        determining a loss of precision from an absolute loss that would result from storing the first updated value by updating the low precision representation in the first memory location,
        determining that the loss of precision exceeds a threshold value,
        in response, storing the first updated value for the first statistic by storing a high precision representation in a second memory location that has a higher storage capacity than the first memory location,
        generating an association between the first memory location and the second memory location,
        receiving a request for the value of the first statistic for use by the machine learning model,
        determining that the low precision representation in the first memory location is associated with the high precision representation in the second memory location, and providing, in response to the request, a combination of the low precision representation in the first memory location and the high precision representation in the second memory location as the value of the first statistic; and providing, as output, the trained machine learning model.

6. The system of claim 5, wherein
storing a value of a first statistic associated with a first machine learning feature in a first memory location comprises:
storing the value of the first statistic in the first memory location in response to determining that storing the value of the first statistic in the first memory location would not result in a loss of precision that exceeds the threshold value.

7. The system of claim 5, the operations further comprising:
storing the association of the first memory location with the second memory location in a hash table.

8. The system of claim 5, wherein the threshold value is set based on a frequency of a statistic.

9. One or more non-transitory computer-readable media storing instructions that when executed by one or more computers cause the one or more computers to perform operations for training and providing a machine learning model, the operations comprising:
obtaining, as input, training data, the training data comprising:
training examples and, for each of the training examples, a respective label, wherein each of the training examples includes a plurality of machine learning features;
training the machine learning model on the training data, training the machine learning model comprising:
storing a value of a first statistic associated with a first machine learning feature of the plurality of machine learning features as a low precision representation in a first memory location,
obtaining, based on a first training example of the training examples, a first updated value for the first statistic during the training of the machine learning model,
determining a loss of precision from an absolute loss that would result from storing the first updated value by updating the low precision representation in the first memory location,
determining that the loss of precision exceeds a threshold value,
in response, storing the first updated value for the first statistic by storing a high precision representation in a second memory location that has a higher storage capacity than the first memory location,
generating an association between the first memory location and the second memory location,
receiving a request for the value of the first statistic for use by the machine learning model,
determining that the low precision representation in the first memory location is associated with the high precision representation in the second memory location, and
providing, in response to the request, a combination of the low precision representation in the first memory location and the high precision representation in the second memory location as the value of the first statistic; and providing, as output, the trained machine learning model.

10. The one or more non-transitory computer-readable media of claim 9, wherein storing a value of a first statistic associated with a first machine learning feature in a first memory location comprises:
storing the value of the first statistic in the first memory location in response to determining that storing the value of the first statistic in the first memory location would not result in a loss of precision that exceeds the threshold value.

11. The one or more non-transitory computer-readable media of claim 9, the operations further comprising:
storing the association of the first memory location with the second memory location in a hash table.

12. The one or more non-transitory computer-readable media of claim 9, wherein the threshold value is set based on a frequency of a statistic.

13. The method of claim 1, wherein the first memory location is a m-bit storage cell and the second memory location is a n-bit storage cell and m<n.

14. The system of claim 5, wherein the first memory location is a m-bit storage cell and the second memory location is a n-bit storage cell and m<n.

15. The one or more non-transitory computer-readable media of claim 9, wherein the first memory location is a m-bit storage cell and the second memory location is a n-bit storage cell and m<n.

* * * * *

UNITED STATES PATENT AND TRADEMARK OFFICE
CERTIFICATE OF CORRECTION

PATENT NO. : 10,062,035 B1
APPLICATION NO. : 14/104004
DATED : August 28, 2018
INVENTOR(S) : Shaked et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 474 days.

Signed and Sealed this
Fourteenth Day of May, 2019

Andrei Iancu
*Director of the United States Patent and Trademark Office*